US008522820B2

(12) United States Patent
Biwanski et al.

(10) Patent No.: US 8,522,820 B2
(45) Date of Patent: Sep. 3, 2013

(54) VALVE SYSTEM WITH CIRCUMFERENTIALLY ORIENTED FLOW

(75) Inventors: Tomasz Waldemar Biwanski, Mazowieckie (PL); Wiktor Jan Wojciechowski, Mazowieckie (PL); Robert Jacek Zreda, Warsaw (PL)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 13/234,306

(22) Filed: Sep. 16, 2011

(65) Prior Publication Data

US 2013/0015387 A1    Jan. 17, 2013

(30) Foreign Application Priority Data

Jul. 15, 2011   (PL) .......................................... 395668

(51) Int. Cl.
*F16K 47/08*         (2006.01)
(52) U.S. Cl.
USPC ........................................ 137/625.3; 251/126
(58) Field of Classification Search
USPC .................. 137/614, 616, 625.3, 625.28, 808; 251/126
See application file for complete search history.

(56) References Cited

U.S. PATENT DOCUMENTS

| | | | |
|---|---|---|---|
| 3,776,278 A | | 12/1973 | Allen |
| 3,857,542 A | | 12/1974 | Heymann |
| 4,892,118 A | | 1/1990 | Davis et al. |
| 5,150,736 A | | 9/1992 | Vincent de Paul et al. |
| 5,318,270 A | | 6/1994 | Detanne et al. |
| 6,070,605 A | * | 6/2000 | Steenburgh ........................ 137/1 |
| 6,260,530 B1 | * | 7/2001 | Keon, Jr. .................... 123/188.8 |
| 6,655,409 B1 | | 12/2003 | Steenburgh et al. |
| 2005/0268973 A1 | * | 12/2005 | Ootomo et al. ............... 137/614 |

* cited by examiner

*Primary Examiner* — John Rivell
*Assistant Examiner* — David Colon Morales
(74) *Attorney, Agent, or Firm* — Cantor Colburn LLP

(57) ABSTRACT

A valve system is provided including a valve seat, an outlet passage and a stop valve. The valve seat has a crenulated portion. The crenulated portion has an annular recess and a plurality of teeth that are separated by a plurality of circumferential gaps. At least one of the teeth has an angled surface that borders between one of the plurality of circumferential gaps and the respective one of the plurality of teeth. The angled surface is oriented at an angle with respect to an axis that extends radially outwardly from a central axis of the valve seat. The outlet passage is located downstream of the valve seat for directing flow out of the valve assembly. The stop valve is located within the annular recess of the crenulated portion.

20 Claims, 3 Drawing Sheets

VALVE SYSTEM WITH CIRCUMFERENTIALLY ORIENTED FLOW

CROSS-REFERENCE TO RELATED APPLICATIONS

This application claims the benefit of Polish Application No. P.395668, entitled "Valve System with Circumferentially Oriented Flow", filed Jul. 15, 2011, which is incorporated herein by reference in its entirety.

BACKGROUND OF THE INVENTION

The subject matter disclosed herein relates to a valve system, and more specifically to a valve system having a valve seat with a crenulated portion that orients flow in a generally circumferential direction.

Operation of a steam turbine may require application of valves that control steam flow upstream of machinery. Typically, there are two types of main valves that control and protect a turbine, control valves and stop valves. Modern steam turbines typically employ valves that are combined control and stop valves, which operate in not only an open and closed mode, but also in intermediate positions as well. Combined control and stop valve includes a control valve having a control valve disk, and a stop valve having a stop valve stem and a stop valve disk. Both valves are assembled in one common pressure vessel and may share one seat. The control valve disk is positioned in relation to a valve seat, and is actuated to modulate flow. The stop valve is situated within an opening located in the valve seat and is typically actuated in some situations to generally prevent turbine overspeed. In one example, the valve seat may include a crenulated portion where flow is split into small jets in an effort to reduce large pressure fluctuations as the control valve disk is actuated.

Solid Particle Erosion (SPE) occurs within a steam turbine when solid particles are exfoliated off of steam turbine components such as, for example, boiler tubes and steam leads. The exfoliated particles become entrained in the steam flow path. The particles are carried by high velocity flow paths located within the steam turbine. These flow paths may cause the particles to impinge against components located within the steam turbine at a relatively high velocity. For example, the particles may impinge against the stop valve stem located within the valve seat of the combined control and stop valve. The issue of particle impingement against the stop valve stem is further compounded with the fact that the valve seat tends to have geometry that directs the particles towards the stop valve stem.

BRIEF DESCRIPTION OF THE INVENTION

According to one aspect of the invention, a valve system is provided including a valve seat, an outlet passage and a stop valve. The valve seat has a crenulated portion. The crenulated portion has an annular recess and a plurality of teeth that are separated by a plurality of circumferential gaps. At least one of the teeth has an angled surface that borders between one of the plurality of circumferential gaps and the respective one of the plurality of teeth. The angled surface is oriented at an angle with respect to an axis that extends radially outwardly from a central axis of the valve seat. The outlet passage is located downstream of the valve seat for directing flow out of the valve assembly. The stop valve is located within the annular recess of the crenulated portion. The angled surface of the at least one of the plurality of teeth orients flow in a generally circumferential direction away from the stop valve stem and towards the outlet passage.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
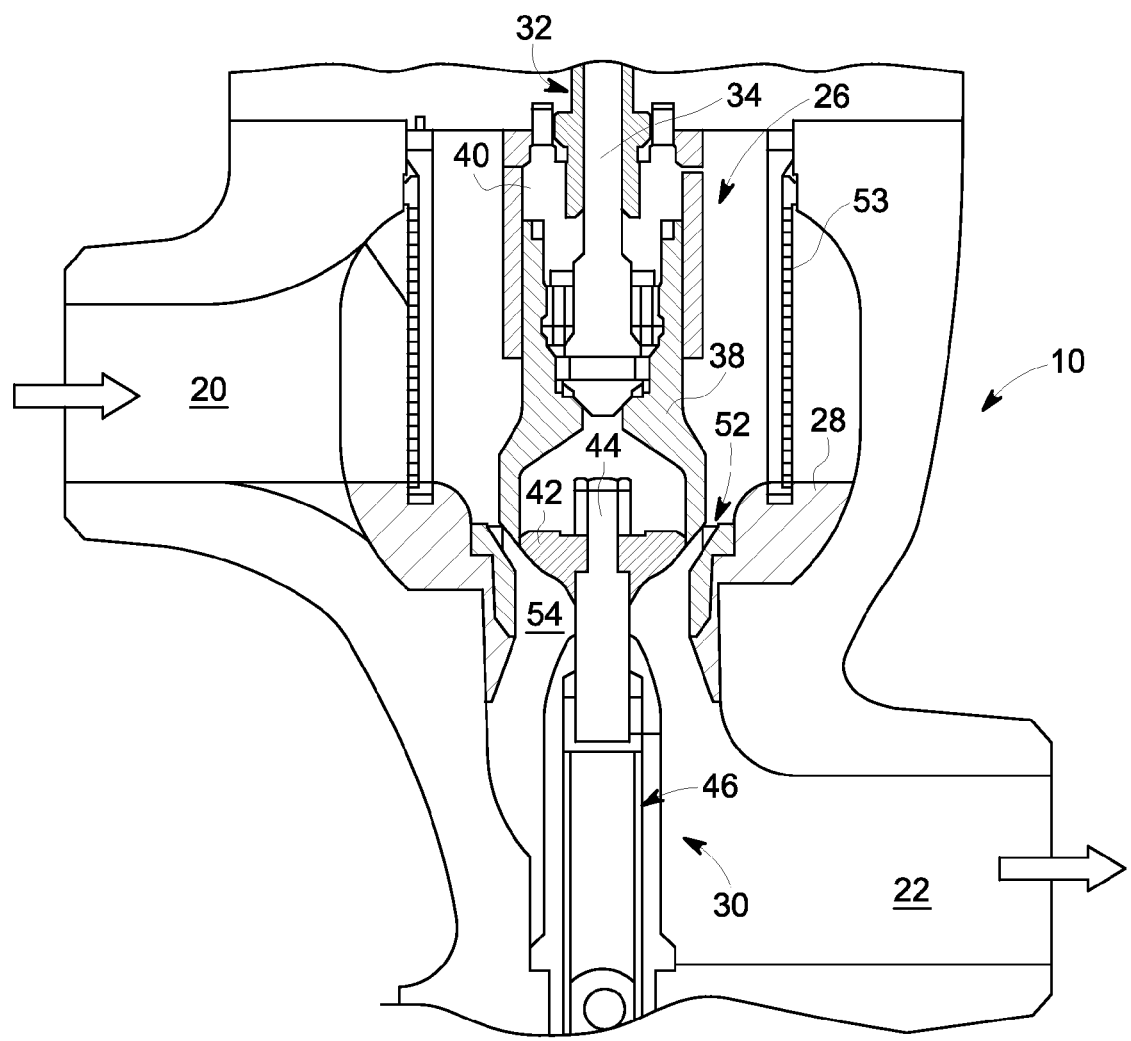
FIG. 1 is a partial cross-sectioned view of an exemplary combined stop-control valve assembly.

Referring now to FIG. 1, an exemplary valve system 10 is illustrated. In the embodiment as shown, the valve system 10 is a combined stop-control valve. A control valve assembly 26 operates at an open and closed mode and also in intermediate positions to modulate flow. A stop valve assembly 30 may operate either in on/off or in a controlled mode. The valve system 10 includes a flow inlet 20, a flow outlet 22, the control valve assembly 26, a valve seat 28, and the stop valve assembly 30. Flow enters the valve system 10 through the flow inlet 20 and exits the valve system 10 through flow outlet 22. The control valve assembly 26 includes a control valve bushing 32, a control valve stem 34, a control valve disk 38, and a balance chamber 40. The stop valve 30 includes a stop valve disk 42, a stop valve stem 44, and a pressure seal head 46. The valve seat 28 includes a crenulated portion 52. In the embodiment as shown, the crenulated portion 52 of the valve seat 28 is an insert, however it is understood that in an alternative embodiment the crenulated portion 52 and the valve seat 28 are a single unitary part. The valve assembly 10 may also include a screen 53 that is annular and is located around the control valve 26 and the stop valve 30. In one exemplary embodiment, the valve system 10 is utilized in a steam turbine system, and is used for directing the supply of steam to machinery located within the steam turbine. However it is understood that the valve system 10 may also be employed in other applications as well.

Figure 3:
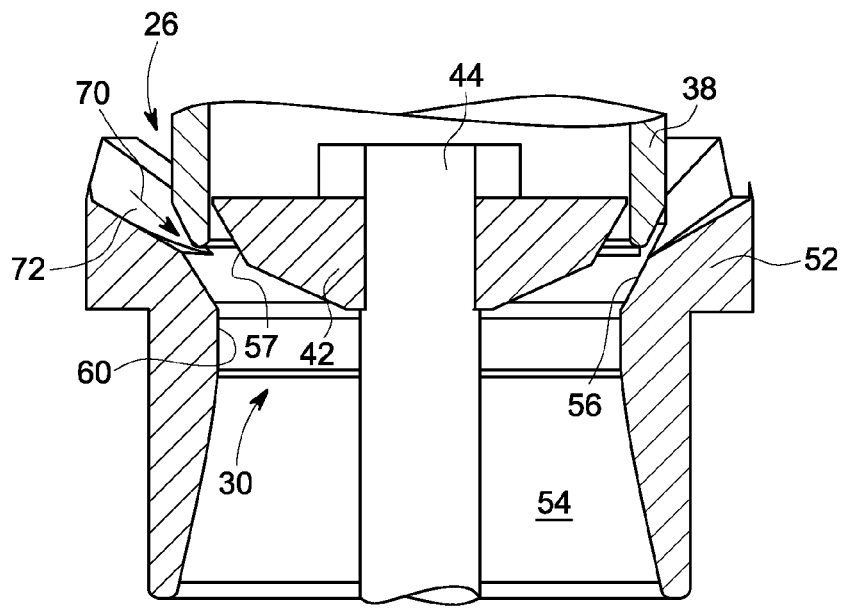
FIG. 3 is a cross-sectioned view of the valve seat and a stop valve shown in FIG. 1.

The control valve disk 38 is generally annular and is positioned above the valve seat 28. The control valve disk 38 is moveable in a direction towards the valve seat 28 and in a direction away from the valve seat 28 to modulate flow out of the flow outlet 22. Referring to FIG. 3, which is an enlarged view of the control valve disk 38 and the crenulated portion 52 of the valve seat 28, the control valve disk 38 selectively seats against a non-crenulated sealing surface 56 to block off a portion of the flow. The control valve disk 38 is actuated in a direction away from the sealing surface 56 of the valve seat 28 to modulate the amount of flow passing though the valve assembly 10. The position of the control valve disk 38 relative to the sealing surface 56 typically changes in response to load changes made within the steam turbine (not shown). For example, if the turbine increases speed, then the control valve 26 will respond by closing off flow by lowering the control valve disk 38 towards the sealing surface 56, which in turn reduces the amount of flow exiting the flow outlet 22 (FIG. 1) and entering a steam turbine.

Referring to FIGS. 1 and 3, the stop valve assembly 30 is located downstream of the crenulated portion 52 of the valve seat 28. Specifically, the stop valve disk 42, the stop valve stem 44, and the pressure seal head 46 are each located within the recess 54. Referring specifically to FIG. 3, a sealing surface 57 of the stop valve disk 42 selectively seals against a non-crenulated sealing surface 56 of the crenulated portion 52 of the valve seat 28 to substantially prevent flow from passing through the valve assembly 10 and out of the flow outlet 22 (FIG. 1) to a steam turbine.

Figure 2:
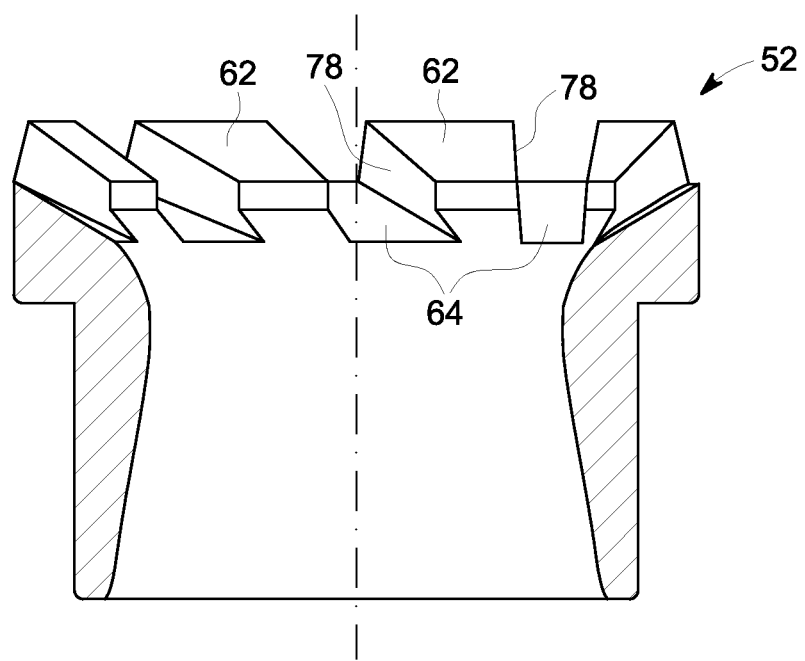
FIG. 2 is a cross-sectioned view of a valve seat shown in FIG. 1.
Figure 4:
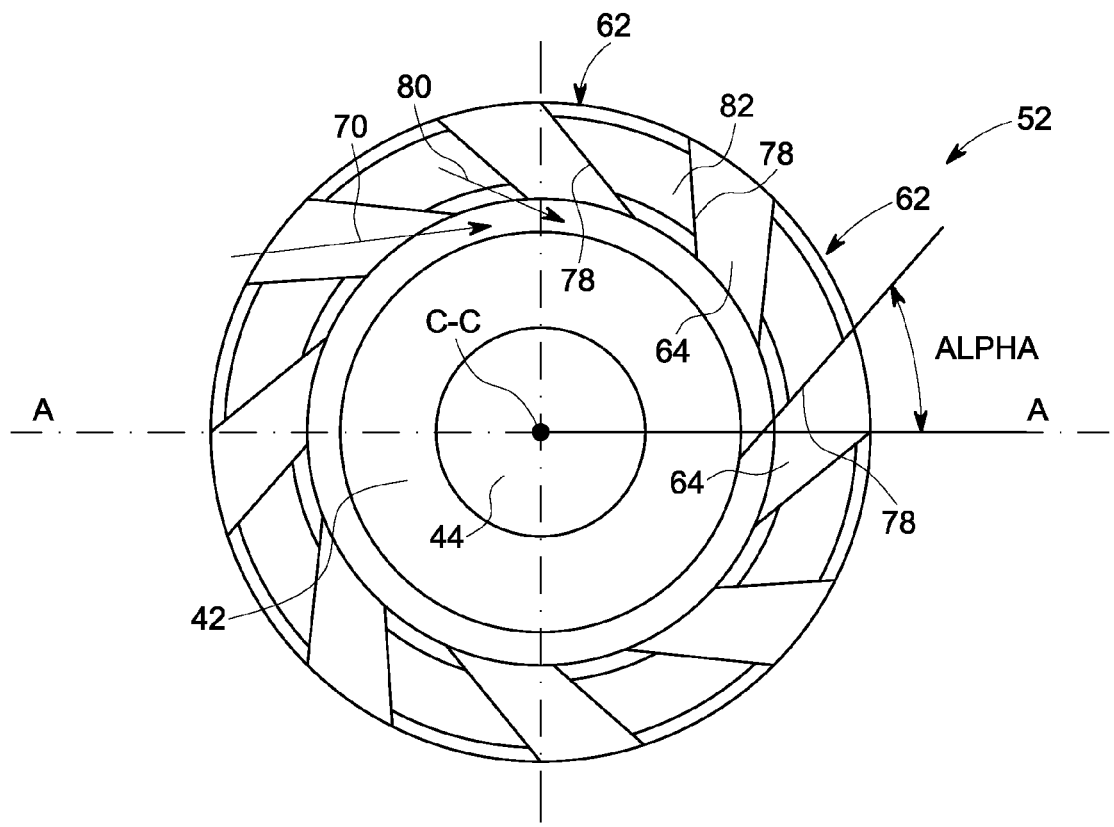
FIG. 4 is a top view of the valve seat shown in FIG. 2.

FIG. 2 is a sectional view of the crenulated portion 52 of the valve seat 28. The crenulated portion 52 includes a plurality of teeth 62 that are separated by a plurality of circumferential gaps 64. Referring to both of FIGS. 2-3, a quantity of fluid 70 passes through a channel 72 and into the recess 54 of the crenulated portion 52 of the valve seat 28. The quantity of fluid 70 then exits the valve assembly 10 through the flow outlet 22 (FIG. 1). The channel 72 is located between the control valve disk 38 the circumferential gaps 64 of the valve seat 28. Specifically, if the control valve disk 38 is positioned to modulate flow, then fluid passes through the channel 72 and out of the flow outlet 22. Referring to FIGS. 2-4, a secondary quantity of fluid 80 may also leak between an upper surface 82 of the teeth 62 and the control valve disk 38 as well when the control valve disk 38 modulates flow.

Referring now to FIGS. 2 and 4, the teeth 62 of the crenulated portion 52 of the valve seat 28 have a generally twisted or angled profile for directing the flow of the quantity of fluid 70 (FIG. 3) and the secondary quantity of fluid 80 (FIG. 4) in a generally circumferential direction. Specifically, at least one of the teeth 62 has an angled surface 78, however in the embodiment as shown, both sides of the tooth 62 include angled surfaces 78. Turning now to FIG. 4, the angled surface 78 borders one of the circumferential gaps 64 and the respective tooth 62. The angled surface 78 is oriented at an angle Alpha that is measured with respect to an axis A-A of the crenulated portion 52 of the valve seat 28. The axis A-A of the valve seat 28 extends radially outwardly from a central axis C-C of the valve seat 28. In one embodiment, the angle Alpha includes dimensions higher than about zero degrees and lower than about ninety degrees. In the embodiment as shown in FIG. 4, each of the teeth 62 have a generally twisted or angled profile, however it is understood that some of the teeth 62 may not include the angled profile as well.

Referring now to FIGS. 1 and 4, the crenulated portion 52 of the valve seat 28 has a generally twisted or angled profile for directing the quantity of fluid 70 and the secondary quantity of fluid 80 in a circumferential direction C, and generally away from the stop valve stem 44. The twisted or angled profile of the crenulated portion 52 also directs the quantity of fluid 70 and the secondary quantity of fluid 80 downstream of the stop valve disk 42. Directing the quantity of fluid 70 and the secondary quantity of fluid 80 away from the components of the stop valve assembly 30 can be especially helpful in the event Solid Particle Erosion (SPE) occurs. Specifically, if solid particles are exfoliated off of steam turbine components and are carried by high velocity flow paths located within the steam turbine, the particles tend to impinge against components located within the steam turbine at relatively high rates of velocity. Directing the quantity of fluid 70 and the secondary quantity of fluid 80 away from the components of the stop valve 30 reduces or substantially prevents particles from impinging against the stop valve stem 44 and the stop valve disk 42.

The generally twisted or angled profile of the crenulated portion 52 of the valve seat 28 also tends to unify the flow around the perimeter of the of the control valve disk 38, which tends to reduce or substantially diminish fluid induced vibration of the control valve disk 38. Moreover, at certain operating conditions, the angled profile of the crenulated portion 52 may also substantially prevent flow detachment at the valve seat 28. Therefore, under certain operating conditions pressure losses across the valve assembly 10 are also reduced. Thus, the generally twisted or angled profile of the crenulated portion 52 may enhance durability, increase reliability, and reduce noise of the valve assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve system, comprising:
   a valve seat having a crenulated portion, the crenulated portion having an annular recess and a plurality of teeth that are separated by a plurality of circumferential gaps, at least one of the plurality of teeth having an angled surface that borders between one of the plurality of circumferential gaps and the respective one of the plurality of teeth, the angled surface being oriented at an angle with respect to an axis that extends radially outwardly from a central axis of the valve seat;
   an outlet passage located downstream of the valve seat for directing flow out of the valve assembly; and
   a stop valve located within the annular recess of the crenulated portion, the angled surface of the at least one of the plurality of teeth orienting flow in a generally circumferential direction away from the stop valve and towards the outlet passage.

2. The valve system of claim 1, comprising a control valve having a control valve disk that is moveable in a direction towards the valve seat and in a direction away from the valve seat, the control valve disk and the valve seat cooperating together to modulate flow exiting the outlet passage.

3. The valve system of claim 2, wherein the control valve disk selectively seals against a portion of the valve seat.

4. The valve system of claim 2, wherein a quantity of fluid passes through a channel located between the control valve disk and the circumferential gaps of the crenulated portion of the valve seat.

5. The valve system of claim 4, wherein another quantity of fluid passes between an upper surface of the plurality of teeth and the control valve disk.

6. The valve system of claim 5, wherein the quantity of fluid and the another quantity of fluid flow into the recess of the crenulated portion of the valve seat, and exit the valve assembly through the flow outlet.

7. The valve system of claim 1, wherein the stop valve has a stop valve stem and a stop valve seat, wherein the stop valve seat selectively seals against the valve seat.

8. The valve system of claim 7, wherein the angled surface of the at least one plurality of teeth directs flow in the circumferential direction away from the valve stem and downstream of the stop valve disk.

9. The valve system of claim 1, wherein the angle has dimensions higher than about zero degrees and lower than about ninety degrees.

10. The valve system of claim 1, wherein the valve system directs steam out of the outlet passage of the valve assembly.

11. A valve system, comprising:
a valve seat having a crenulated portion, the crenulated portion having an annular recess and a plurality of teeth that are separated by a plurality of circumferential gaps, at least one of the plurality of teeth having an angled surface that borders between one of the plurality of circumferential gaps and the respective one of the plurality of teeth, the angled surface being oriented at an angle with respect to an axis that extends radially outwardly from a central axis of the valve seat;
an outlet passage located downstream of the valve seat for directing flow out of the valve assembly;
a control valve having a control valve disk that is moveable in a direction towards the valve seat and in a direction away from the valve seat, the control valve disk and the valve seat cooperating together to modulate flow exiting the outlet passage; and
a stop valve located within the annular recess of the crenulated portion, the stop valve having a stop valve stem and a stop valve seat, the stop valve seat selectively sealing against the valve seat, and the angled surface of the at least one of the plurality of teeth orienting flow in a generally circumferential away from the valve stem and downstream of the stop valve disk.

12. The valve system of claim 11, wherein the control valve disk selectively seals against the valve seat.

13. The valve system of claim 11, wherein a quantity of fluid passes through a channel located between the control valve disk and the circumferential gaps of the crenulated portion of the valve seat.

14. The valve system of claim 13, wherein another quantity of fluid passes between an upper surface of the plurality of teeth and the control valve disk.

15. The valve system of claim 14, wherein the quantity of fluid and the another quantity of fluid flow into the recess of the crenulated portion of the valve seat and exit the valve assembly through the flow outlet.

16. The valve system of claim 11, wherein the angle has dimensions higher than about zero degrees and lower than about ninety degrees.

17. The valve system of claim 11, wherein the valve system directs steam out of the outlet passage of the valve assembly.

18. A valve system, comprising:
a valve seat having a crenulated portion, the crenulated portion having an annular recess and a plurality of teeth that are separated by a plurality of circumferential gaps, at least one of the plurality of teeth having an angled surface that borders between one of the plurality of circumferential gaps and the respective one of the plurality of teeth, the angled surface being oriented at an angle with respect to an axis that extends radially outwardly from a central axis of the valve seat, the angle having dimensions higher than about zero degrees and lower than about ninety degrees;
an outlet passage located downstream of the valve seat for directing steam out of the valve assembly;
a control valve having a control valve disk that is moveable in a direction towards the valve seat and in a direction away from the valve seat, the control valve disk and the valve seat cooperating together to modulate steam exiting the outlet passage, and the control valve disk selectively sealing against the valve seat; and
a stop valve located within the annular recess of the crenulated portion, the stop valve having a stop valve stem and a stop valve seat, the stop valve seat selectively sealing against the valve seat, and the angled surface of the at least one of the plurality of teeth orienting steam in a generally circumferential away from the valve stem and downstream of the stop valve disk.

19. The valve system of claim 18, wherein a quantity of fluid passes through a channel located between the control valve disk and the circumferential gaps of the crenulated portion of the valve seat.

20. The valve system of claim 19, wherein another quantity of fluid passes between an upper surface of the plurality of teeth and the control valve disk.

* * * * *